US007089724B2

(12) United States Patent
Black, III

(10) Patent No.: US 7,089,724 B2
(45) Date of Patent: Aug. 15, 2006

(54) FLEXIBLE PUSH/PULL/ROTARY CABLE

(75) Inventor: Adam R. Black, III, Middletown, NJ (US)

(73) Assignee: S.S. White Technologies Inc., Piscataway, NJ (US)

( * ) Notice: Subject to any disclaimer, the term of this patent is extended or adjusted under 35 U.S.C. 154(b) by 0 days.

(21) Appl. No.: 11/052,177

(22) Filed: Feb. 7, 2005

(65) Prior Publication Data

US 2005/0178103 A1 Aug. 18, 2005

Related U.S. Application Data

(60) Provisional application No. 60/544,142, filed on Feb. 12, 2004.

(51) Int. Cl.
*D02G 3/22* (2006.01)

(52) U.S. Cl. ........................................................ 57/213

(58) Field of Classification Search .................. 57/213, 57/214, 218, 219
See application file for complete search history.

(56) References Cited

U.S. PATENT DOCUMENTS

| | | | | |
|---|---|---|---|---|
| 571,869 | A | 11/1896 | Stow | |
| 1,811,697 | A | 6/1931 | Reilly | |
| 1,905,197 | A | 4/1933 | Webb | |
| 1,952,301 | A | 3/1934 | Webb | |
| 2,000,997 | A | 5/1935 | Sharpe | |
| 2,401,100 | A | 5/1946 | Pile | |
| 3,043,120 | A | 7/1962 | Waldron | |
| 3,192,795 | A | 7/1965 | Pierce | |
| 3,242,691 | A | 3/1966 | Robinson et al. | |
| 3,274,846 | A | 9/1966 | Forster | |
| 3,705,489 | A | 12/1972 | Smollinger | |
| 3,791,898 | A | 2/1974 | Remi | |
| 3,979,896 | A | 9/1976 | Klett et al. | |
| 4,112,708 | A | 9/1978 | Fukuda | |
| 4,629,707 | A | 12/1986 | Wolfe | |
| 4,655,610 | A | 4/1987 | Al-Jaroudi | |
| 5,288,270 | A | 2/1994 | Ishikawa | |
| 5,461,850 | A * | 10/1995 | Bruyneel et al. | 57/212 |
| 6,189,309 | B1 * | 2/2001 | Han | 57/213 |
| 6,276,120 | B1 * | 8/2001 | Adriaensen et al. | 57/210 |
| 2004/0060631 | A1 * | 4/2004 | Cordonnier et al. | 152/527 |

* cited by examiner

*Primary Examiner*—Shaun R. Hurley
(74) *Attorney, Agent, or Firm*—Arthur L. Lessler

(57) ABSTRACT

A hybrid flexible wire shaft having an inner portion with the characteristics of a push/pull shaft having at least one layer of wire groups helically wound on a core wire at a relatively high pitch angle, and an outer portion with the characteristics of a torsional transmission flexible shaft having two or more layers of wire groups wound on the central portion at a relatively low pitch angle. Each layer of the outer group is wound in a direction opposite to the wind direction of each adjacent layer of that group. In an alternate construction, the high and low pitch portions are reversed and an additional outer layer is provided which is wound in a direction opposite to the outermost layer of the high pitch portion.

13 Claims, 4 Drawing Sheets

23
24
22
25
21
20

PRIOR ART - TYPICAL FLEXIBLE SHAFT CONSTRUCTION

FLEXIBLE PUSH/PULL/ROTARY CABLE

CROSS-REFERENCE TO RELATED APPLICATION

This application claims the benefit of U.S. Provisional Application Ser. No. 60/544,142 filed Feb. 12, 2004 and entitled Flexible Push/Pull/Rotary Cable.

BACKGROUND OF THE INVENTION

The present invention relates to a flexible wire cable or shaft for transmitting torque, compression (pushing) and tension (pulling) forces, or all three-types of forces.

Some prior art push/pull wire wound cables, and some prior art torque transmission wire wound flexible shafts are disclosed in U.S. Pat. Nos. 571,869; 1,811,697; 1,905,197; 1,952,301; 2,000,997; 2,401,100; 3,043,120; 3,192,795; 3,242,691; 3,274,846; 3,705,489; 3,791,898; 3,979,896; 4,112,708; 4,629,707; 4,655,610; and 5,288,270.

Prior art push/pull wire cables which are designed to transmit compression and tension forces usually consist of a central core wire and one or two layers of a group of equal diameter wires helically wound about the core in the same direction with a high pitch angle, typically in the 70° range. Such cables are not suitable for use in transmitting torque because:

- a. Since the wire layers are wound in the same direction, they tend to unwind if an attempt is made to transmit torque in a direction opposite to the wind direction.
- b. Since the pitch angle is high, most of an applied longitudinal compression Qr tension force is transmitted efficiently through the wires but only a relatively small part of an applied torsional force is transmitted efficiently through the wires. As a result, a relatively large diameter cable of the push/pull construction type is required to transmit a given torsional force, as compared with a flexible wire wound shaft designed to transmit torsional force.
- c. Push/pull wire cables of the aforementioned construction are relatively stiff in bending as compared with flexible shafts designed for transmitting torque, such stiffness being an undesirable characteristic.

On the other hand, flexible wire shafts designed to transmit torque generally consist of a central core upon which multiple layers of wire groups are wound, with adjacent layers being wound in opposite pitch directions, with a substantially lower pitch angle (typically 55° or less, a range of 30° to 55° being preferred) than that of the layers of a push/pull wire cable. This construction results in significantly greater flexibility and higher torque transmission capability for a given diameter, as compared with push/pull cables. However, these shafts have a considerably greater tendency than push/pull wire cables to unwind when subjected to compression forces.

Accordingly, an object of the present invention is to provide a flexible wire cable which exhibits favorable characteristics of both push/pull cables and torsion-transmitting flexible shafts.

SUMMARY OF THE INVENTION

A hybrid wire wound shaft or cable is provided with a central portion having a core wire upon which at least one layer of a group of wires is helically wound in a given direction with a relatively high pitch angle, and an outer portion made of two or more layers of wire groups which are helically wound on the central portion at a relatively low pitch angle, each of the layers of the outer portion being wound in a direction opposite to every adjacent layer.

IN THE DRAWING

FIGS. 1(*a*) through 1(*e*) show cross-sectional views of various prior art wire wound flexible cable constructions.

DETAILED DESCRIPTION

Figures 1, 1A:
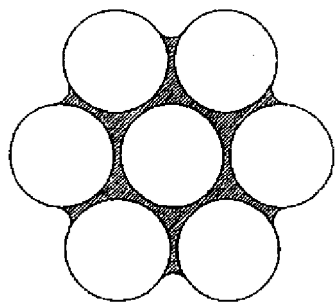

FIGS. 1(*a*) through 1(*e*) are cross-sectional views of typical prior art wire wound push/pull cable strand constructions. A typical push/pull wire wound shaft or cable, such as that known in the art as a 1×7 cable strand (FIG. 1(*a*)), consists of a central or core wire and a group of six equal diameter wires helically wound or wrapped around the core wire. The wire diameters are typically selected so that the pitch or helix angle is in the 70° range. This construction, which is efficient for push/pull operation but not for transmitting torque or rotary motion is relatively stiff in bending as compared to constructions having a greater number of wire layers and designed to transmit the same amount of force.

A 1×19 push/pull cable strand (FIG. 1(*b*)) consists of two layers of wire wrapped around a single core wire, the innermost layer consisting of a group of six wires and the outermost layer consisting of a group of twelve wires. Both layers are wound or wrapped in the same pitch direction, so that the wires of adjacent layers have line contact with each other. This construction also is relatively stiff in bending as compared to constructions having a greater number of wire layers and designed to transmit the same amount of force—such as (i) 3×7 (three 1×7 strands helically twisted together) (FIG. 1(*c*)), (ii) 7×7 (a 1×7 core strand with six 1×7 strands wound thereon) (FIG. 1(*d*)), or (iii) 7×19 (a 1×19 core strand with six 1×19 strands wound thereon) (FIG. 1(*e*)).

In the push/pull cable constructions of FIGS. 1(*a*) through 1(*e*), all of the layers are helically wound in the same direction, at a pitch angle in the range of 65° to 75°.

All these push/pull cable constructions, and especially the constructions having more than one wire layer, have a tendency to unravel in compression (pushing action), which reduces the compressive loads they can withstand. Due to their relatively high pitch angles, none of these cables are suitable for torsional loading.

Flexible wire shafts for transmitting torque, on the other hand, are designed to transmit torsional loads in one or both directions of rotation (clockwise or counterclockwise).

Figures 1, 1D, 2, 3, 4, 5, 6, 7:
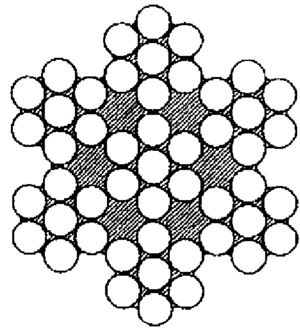
FIG. 2 shows the winding construction of a typical prior art wire wound torque transmitting flexible shaft.
FIG. 3 shows the winding construction of a flexible wire wound push/pull/rotary shaft or cable according to a preferred embodiment of the present invention.
FIG. 4 shows the winding construction of a flexible wire wound push/pull/rotary shaft or cable according to an alternate preferred embodiment of the present invention.
Figures 1, 1B:
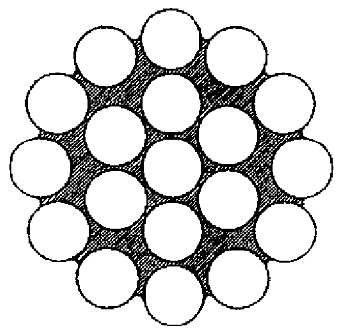
Figures 1, 1E, 2, 3, 4, 5, 6, 7:
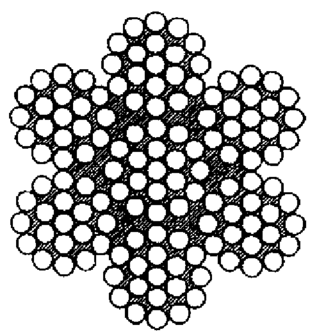
Figures 1, 1C, 2, 3:
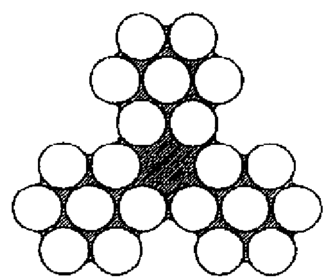
Figure 2:
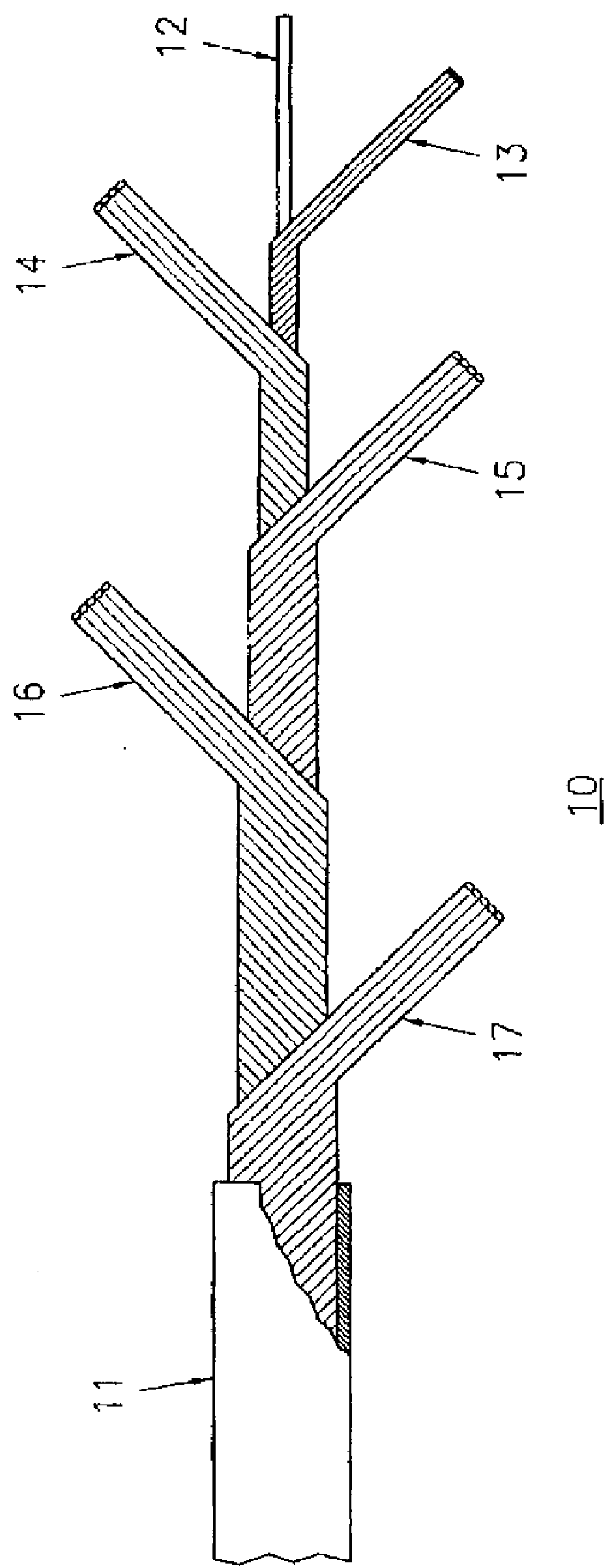
Figure 3:
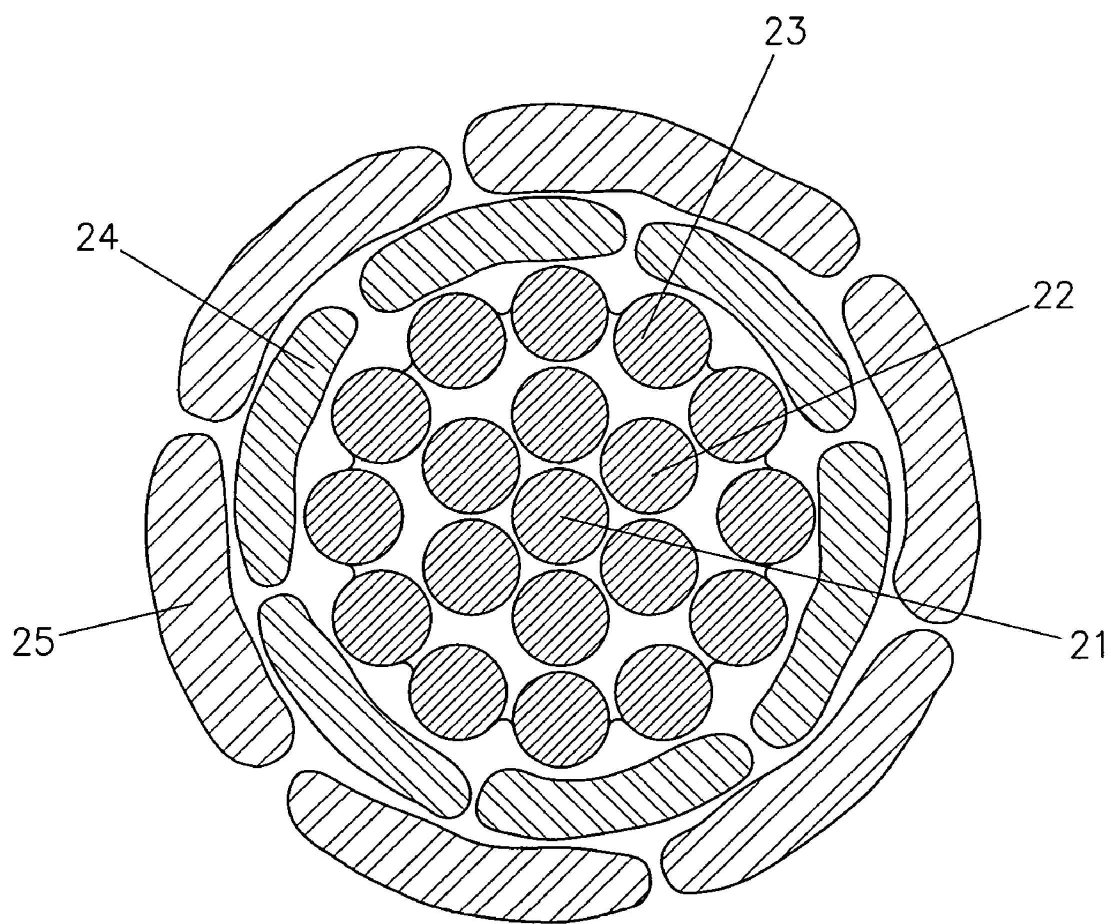
Figure 4:
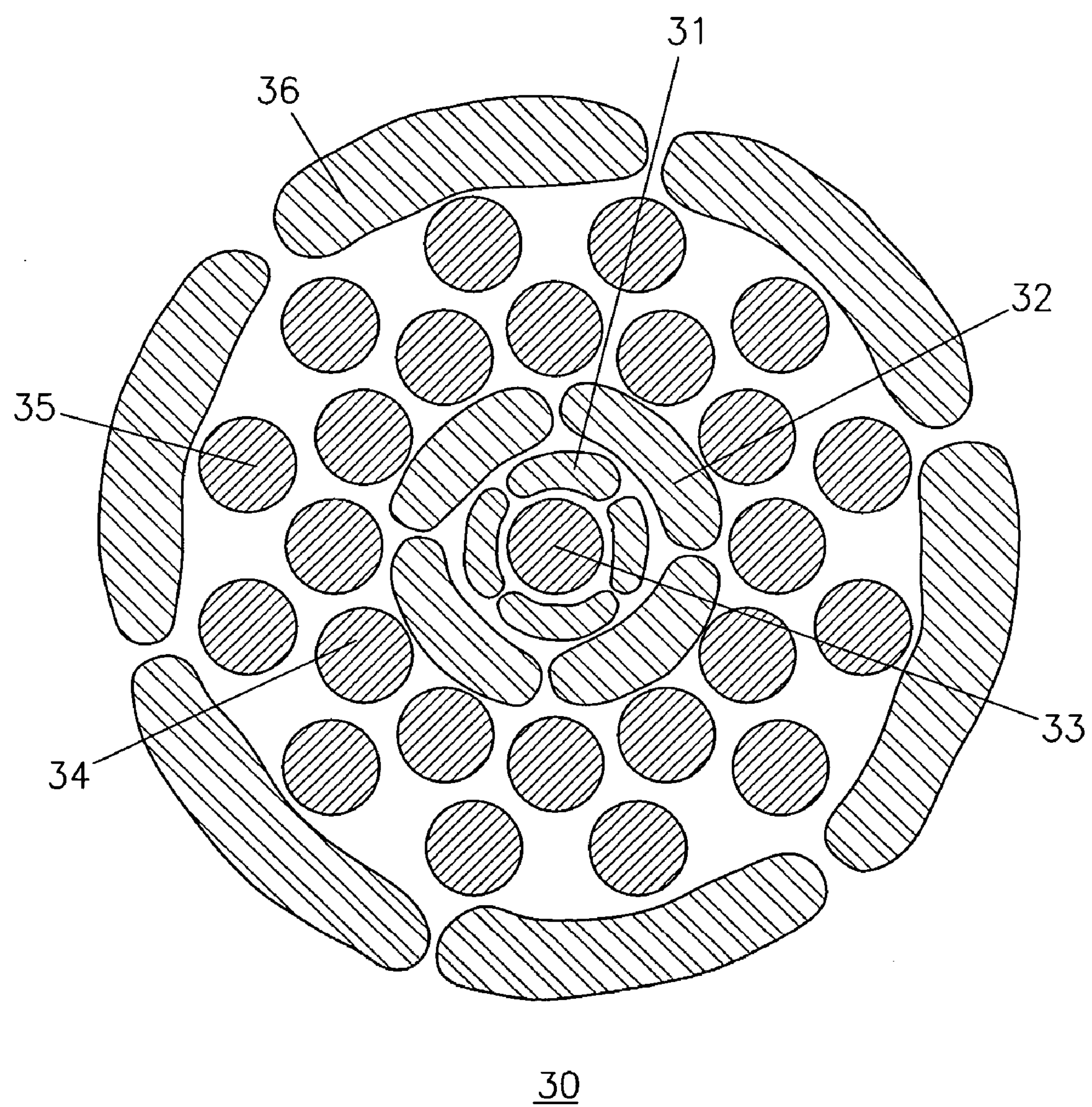

The winding arrangement of a typical flexible shaft of this type is shown in FIG. 2, which shows a shaft 10 having an end fitting 11 and comprising a core 12, a first layer 13 consisting of three wires wound in a counterclockwise direction (as viewed looking right to left, i.e. looking along the shaft at the end fitting 11), a second layer 14 consisting of four wires wound in a clockwise direction, a third layer 15 consisting of four wires wound in a counterclockwise direction, a fourth layer 16 consisting of five wires wound in a clockwise direction, and a fifth layer 17 consisting of five wires wound in a counterclockwise direction; each of said layers being wound at a pitch angle in the range of 30° to 55°.

Such a flexible shaft construction differs from a push/pull cable strand construction in that it consists of multiple layers, sequentially pitched in opposite directions (pitch direction alternates with each layer), with the pitch angles being considerably lower (usually 55° or less) than a push/pull cable strand (usually about 70°). This multiple layer, low pitch angle construction results in a more flexible cable than a single layer push/pull cable, for a given diameter.

Such torque transmitting shafts, however, are inefficient for transmitting compressive force, as the shafts tend to unwind, and due to the low pitch angle only a relatively small portion of the compressive force is transmitted along the length of the wires, so that a relatively large diameter shaft is required to transmit a given compressive load.

Thus both the push/pull and the torque-transmitting types of wire wound flexible cables or shafts have deficiencies when multi-purpose operation (pushing, pulling, and rotating a load in one or two directions) is desired.

The present invention overcomes these deficiencies by providing a hybrid wire wound flexible cable, which has a central portion with the characteristics of a push/pull cable and an outer portion with the characteristics of a torque transmitting flexible shaft.

As shown in FIG. 3, according to a preferred embodiment of the invention the central portion of a hybrid cable 20 is made of a core wire 21 upon which one or two layers [two layers 22 and 23 are shown in the embodiment of FIG. 3] of a group of wires [the layers 22 and 23 consists of six wires and twelve wires respectfully] is wound at a relatively high pitch angle, in the range of 65° to 75° and preferably about 70° [the layers 22 and 23 are wound at a 70° pitch angle], with the layers 22 and 23 being wound in the same direction. There may, if desired, be a different number of wires in each highly pitched group, i.e. in each of the layers 22 and 23.

If desired, more than two layers can be used for the central highly pitched portion of the cable, with all such layers being wound in the same direction.

The outer portion of the hybrid cable 20 is made of two or more layers [two layers 24 and 25 are shown in FIG. 3] of a group of wires wound on the outermost layer of the central portion at a relatively low pitch angle, in the range of 30° to 55°, with each layer being wound in a direction opposite to the adjacent layer, and the innermost layer 24 of the outer portion (comprising layers 24 and 25) being wound in a direction opposite to the outermost layer 23 of the central portion (comprising layers 22 and 23). There may if desired be a different number of wires in each group, i.e. in each of the layers 24 and 25.

If the relatively low pitch outer portion of the hybrid cable consists of more than two layers, each layer is wound in a pitch direction opposite to the adjacent layers.

The central portion (layers 22 and 23 in the preferred embodiment) provides efficient transmission of compression and tension forces, while the outer portion (layers 24 and 25 in the preferred embodiment) provides efficient transmission of torsional forces. Since the innermost layer (24 in the preferred embodiment) of the outer portion is pitched in the opposite direction to the outermost layer (23 in the preferred embodiment) of the central portion, that innermost layer resists the tendency of the layer or layers of the central portion to unravel in compression.

If a single strand cable (1×7 or 1×19 for example) is used as the central portion, the diameter of this strand can be kept relatively small so as to maintain flexibility in the hybrid cable. If the central portion has two wire layers, a larger diameter cable can be used and bending flexibility can still be maintained.

The relatively high and low pitch angle portions of the hybrid cable construction can, if desired, be reversed with an outer relatively low pitch angle portion being provided, as in the alternate preferred embodiment shown in FIG. 4. In said alternate embodiment, there are three layer portions, namely inner and outer portions which provide primary support for the rotary function, i.e. for transmitting torque, and an intermediate portion which provides primary support for the push/pull function, i.e. for transmitting compression and tension forces.

In the embodiment of FIG. 4:

(i) the inner layers 31 and 32 of the hybrid cable 30 are wound in opposite directions to each other on the core 33 at a relatively low pitch angle to comprise the inner portion;

(ii) an intermediate portion comprising one or more layers (two layers 34 and 35 are shown in FIG. 4) of a group of wires are wound in the same direction as each other and in a direction opposite to the wind direction of the layer 32 on the inner portion at a relatively high pitch angle; and (iii) an outer portion comprising at least one additional wire layer 36 of a group of wires is wound on the intermediate portion in a direction opposite to the winding direction of the outermost layer 35 of the intermediate portion at a relatively low pitch angle.

With this arrangement the wire layer or layers of the outer portion counter the tendency of the wires of the intermediate portion to unravel when subjected to compression forces.

The layers 31, 32, and 36 are wound at a pitch angle in the range of 30° to 55°. The layers 34 and 35 are wound at a pitch angle in the range of 65° to 75°, with 70° being preferred.

I claim:

1. A hybrid wire wound flexible shaft comprising:

a central portion having a core wire upon which at least one layer of a group of wires is helically wound in a given direction with a relatively high pitch angle; and an outer portion comprising at least two layers of wire groups which are helically wound on the central portion at a relatively low pitch angle, each of the layers of the outer portion being wound in a direction opposite to every adjacent layer of the outer portion, the innermost layer of the outer portion being wound in a direction opposite to the outermost layer of the central portion.

2. A hybrid wire wound flexible shaft comprising:

a central portion having a core wire upon which at least one layer of a group of wires is helically wound in a given direction with a relatively high pitch angle; and an outer portion comprising at least two layers of wire groups which are helically wound on the central portion at a relatively low pitch angle, each of the layers of the outer portion being wound in a direction opposite to every adjacent layer of the outer portion, the innermost layer of the outer portion being wound in a direction opposite to the outermost layer of the central portion, wherein said relatively high pitch angle is at least 70° and said relatively low pitch angle is not more than 55°.

3. A hybrid wire wound flexible shaft comprising:

a central portion having a core wire upon which at least one layer of a group of wires is helically wound in a given direction with a relatively high pitch angle; and an outer portion comprising at least two layers of wire groups which are helically wound on the central portion at a relatively low pitch angle, each of the layers of the outer portion being wound in a direction opposite to every adjacent layer of the outer portion, the innermost layer of the outer portion being wound in a direction opposite to the outermost layer of the central portion, wherein said relatively high pitch angle is in the range of 65° to 75° and said relatively low pitch angle is in the range of 30° to 55°.

4. The flexible shaft according to claim 1, wherein each group of wires comprises at least six wires.

5. The flexible shaft according to claim 2, wherein each group of wires comprises at least six wires.

6. The flexible shaft according to claim 3, wherein each group of wires comprises at least six wires.

7. A hybrid wire wound flexible shaft comprising:

a central portion having a core wire upon which at least two layers of wire groups are helically wound at a relatively low pitch angle, each of the layers of the central portion being wound in a direction opposite to every adjacent layer of the central portion;

an intermediate portion comprising at least one layer of a group of wires helically wound on the outermost layer of the central portion at a relatively high pitch angle, each layer of the intermediate portion being wound in the same direction as each other layer of the intermediate portion, the innermost layer of the intermediate portion being wound in a direction opposite to the wind direction of the outermost layer of the central portion; and an outer portion comprising at least one layer of a group of wires helically wound on the outermost layer of the intermediate portion at a relatively low pitch angle, the innermost layer of the outer portion being wound in a direction opposite to the wind direction of the outermost layer of the intermediate portion.

8. The flexible shaft according to claim 7, wherein said relatively high pitch angle is at least 70° and said relatively low pitch angle is not more than 55°.

9. The flexible shaft according to claim 7, wherein said relatively high pitch angle is in the range of 65° to 75° and said relatively low pitch angle is in the range of 45° to 55°.

10. The flexible shaft according to claim 7, wherein each group of wires comprises at least six wires.

11. The flexible shaft according to claim 8, wherein each group of wires comprises at least six wires.

12. The flexible shaft according to claim 9, wherein each group of wires comprises at least six wires.

13. A hybrid wire wound flexible shaft comprising:

a central portion having a core wire upon which at least one layer of a group of wires is helically wound in a given direction, each layer of said central portion having a pitch angle in the range of 65° to 75°; and an outer portion comprising at least two layers of wire groups helically wound on the central portion at a pitch angle in the range of 30° to 55°, each layer of the outer portion being wound in a direction opposite to each adjacent layer of the outer portion, the innermost layer of the outer portion being wound in a direction opposite to the wind direction of the outermost layer of the central portion.

* * * * *